(12) United States Patent
Nackerud et al.

(10) Patent No.: US 9,784,957 B2
(45) Date of Patent: Oct. 10, 2017

(54) UNIFORMITY ADJUSTMENT METHOD FOR A DIODE-LASER LINE-PROJECTOR

(71) Applicant: Coherent, Inc., Santa Clara, CA (US)

(72) Inventors: Erik Nackerud, Portland, OR (US); Jimson Lounsbury, Woodburn, OR (US); Patrick Kain, Portland, OR (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 15/207,319

(22) Filed: Jul. 11, 2016

(65) Prior Publication Data

US 2016/0320626 A1 Nov. 3, 2016

Related U.S. Application Data

(62) Division of application No. 13/628,756, filed on Sep. 27, 2012, now Pat. No. 9,400,391.

(51) Int. Cl.
*G02B 27/00* (2006.01)
*G02B 19/00* (2006.01)
*G02B 27/09* (2006.01)

(52) U.S. Cl.
CPC ..... *G02B 19/0014* (2013.01); *G02B 19/0052* (2013.01); *G02B 27/0927* (2013.01); *G02B 27/0955* (2013.01); *G02B 27/0966* (2013.01)

(58) Field of Classification Search
None
See application file for complete search history.

(56) References Cited

U.S. PATENT DOCUMENTS

| | | | |
|---|---|---|---|
| 3,756,641 A | 9/1973 | Dugan | |
| 3,759,618 A | 9/1973 | Rogers et al. | |
| 4,149,773 A * | 4/1979 | Reid | G02B 27/09 359/641 |
| 4,826,299 A | 5/1989 | Powell | |
| 5,064,284 A | 11/1991 | Johnston, Jr. et al. | |
| 5,095,386 A * | 3/1992 | Scheibengraber | A61B 6/08 359/668 |
| 5,283,694 A | 2/1994 | Frady | |
| 5,629,808 A | 5/1997 | Powell | |
| 5,793,784 A | 8/1998 | Wagshul et al. | |
| 5,836,081 A * | 11/1998 | Orosz, Jr. | A61B 5/0215 33/290 |
| 5,838,239 A | 11/1998 | Stern et al. | |
| 5,842,282 A | 12/1998 | Ting | |
| 6,172,742 B1 | 1/2001 | Yamazaki | |
| 6,396,042 B1 | 5/2002 | Boardman et al. | |

(Continued)

FOREIGN PATENT DOCUMENTS

EP 1659438 A1 5/2006

OTHER PUBLICATIONS

Non Final Office Action received for U.S. Appl. No. 13/628,756, mailed on Sep. 11, 2015, 17 pages.

(Continued)

*Primary Examiner* — Tri Ton
*Assistant Examiner* — Jarreas C Underwood
(74) *Attorney, Agent, or Firm* — Morrison & Foerster LLP

(57) ABSTRACT

In a line projector a diode-laser beam having an elliptical cross-section is projected onto a Powell lens which spreads the beam to form a line of light. Distribution of power along the line of light is adjusted by rotating the diode-laser beam with respect to the Powell lens.

9 Claims, 8 Drawing Sheets

(56) References Cited

U.S. PATENT DOCUMENTS

| | | | |
|---|---|---|---|
| 6,588,115 B1 * | 7/2003 | Dong | G01C 15/004 33/227 |
| 6,724,002 B2 | 4/2004 | Mankos et al. | |
| 7,167,322 B2 | 1/2007 | Chern et al. | |
| 7,400,457 B1 * | 7/2008 | Cayer | G02B 27/0927 359/709 |
| 7,630,147 B1 * | 12/2009 | Kar | G02B 27/0927 359/708 |
| 7,920,263 B2 | 4/2011 | Wu et al. | |
| 8,085,468 B2 * | 12/2011 | Kuroda | G01C 15/004 359/618 |
| 8,861,082 B2 * | 10/2014 | Cobb | G02B 27/0927 359/489.08 |
| 9,093,822 B1 | 7/2015 | Chann et al. | |
| 9,400,391 B2 * | 7/2016 | Nackerud | G02B 19/0052 |
| 2006/0227817 A1 | 10/2006 | Chang | |
| 2009/0047014 A1 | 2/2009 | Irie | |
| 2009/0274421 A1 | 11/2009 | Arayama et al. | |

OTHER PUBLICATIONS

Notice of Allowance received for U.S. Appl. No. 13/628,756, mailed on Apr. 1, 2016, 9 pages.

International Search Report and Written Opinion received for PCT Patent Application No. PCT/US2013/061199, mailed on Dec. 11, 2013, 14 pages.

International Preliminary Report on Patentability received for PCT Patent Application No. PCT/US2013/061199, mailed on Apr. 9, 2015, 10 pages.

International Search Report and Written Opinion received for PCT Patent Application No. PCT/US2013/061199, dated Dec. 11, 2013, 14 pages.

Sun et al., "A Practical Guide to Handling Laser Diode Beams", Chapter 2, 2015, pp. 27-51.

* cited by examiner

UNIFORMITY ADJUSTMENT METHOD FOR A DIODE-LASER LINE-PROJECTOR

PRIORITY

This application is a divisional of U.S. patent application Ser. No. 13/628,756, filed Sep. 27, 2012, the disclosure of which is incorporated by reference in its entirety.

TECHNICAL FIELD OF THE INVENTION

The present invention relates in general to optical devices for projecting a line of light from a diode-laser (laser line projectors). The invention relates in particular to laser line projectors wherein an acylindrical lens is used to spread light into a fan of rays forming the length of the line of light.

DISCUSSION OF BACKGROUND ART

Laser line projectors find extensive use in machine vision applications. In these applications, the line of light is projected on a surface and light reflected from the surface is received by a detector. The surface is scanned relative to the detector and the detector output is electronically processed to build up a three-dimensional (3D) image of the surface. It is very important in such an application that light uniformity in the length direction of the projected line be uniform. The more uniform the illumination on the surface, the more faithful a reproduction of the surface the 3D-image will be.

The most common laser line projectors used in machine vision applications are based on a lens having an acylindrical surface (acylindrical lens) usually referred to by practitioners of the art as a Powell lens, after the inventor. Such a lens and an arrangement for using the lens for projecting a line of light are described in detail in U.S. Pat. No. 4,826,299, the complete disclosure of which is hereby incorporated herein by reference. Later variations and applications of the Powell lens are described in U.S. Pat. Nos. 5,283,694; 5,629,808; 7,167,322; and 7,400,457, among others.

A typical basic configuration of a laser line projector includes a diode-laser delivering a laser-beam characterized as having a fast-axis and a slow-axis perpendicular to each other. The diode-laser is followed by a positive lens, and then the acylindrical beam-shaping lens or Powell lens.

The Powell lens itself is characterized in having a first axis in which acylindrical surface has optical power, and a second axis, perpendicular to the first axis, in which the acylindrical surface has zero optical power. The diode-laser is invariably arranged such that the fast- and slow-axes of the diode-laser are aligned precisely (at zero degrees) with the respectively first and second axes of the Powell lens, or vice-versa. The Powell lens spreads the laser beam in the first-axis of the lens such that the power in the beam is spread linearly as a function of spread-angle (fan angle) to provide a uniform or "flat-top" illumination along the spread beam. The positive lens typically configured and positioned to create a focus in the second axis to provide a uniform line of light at about the focus position, i.e., within the focal depth. The positive lens can also be positioned to, collimate or diverge, the beam in the other axis.

In this line projection arrangement the Powell lens is designed for a particular laser-beam size incident on the lens. If the beam incident on the lens does not match this size, the lens will not provide optimum uniformity along the line of light. Indeed, the uniformity of illumination in the line is sensitive even to relatively small variations in beam size incident on the lens.

By way of example FIG. 1 schematically illustrates calculated intensity as a function of fan-angle and beam size in a line spread by a Powell lens optimized for a beam size of 2 mm. The intensity for a beam of the nominal (optimum) beam size is depicted by a fine solid line. The intensity distribution for a beam size 15% smaller than nominal is depicted by a bold dashed line. The intensity distribution for a beam size 15% larger than nominal is depicted by a bold solid line. This distribution is usually termed a "bat-ear" distribution or a "pitchfork" distribution.

A manufacturer of laser line projectors is required to provide projected lines of diverse wavelengths and powers to satisfy the demand of different users. In order to satisfy such diversity, a manufacturer must employ different diode-lasers possibly from different manufacturers in a line-projector product line. This will result in a fixed optical arrangement of the type described above with a range of different beam-sizes at the Powell lens. Absent measures to deal with this, a wide, unacceptable variation in intensity distribution would result.

Various solutions to the problem of varying beam characteristics of diode-lasers are employed. By way of example the beam size may be manipulated by additional optical elements between the diode-laser and the Powell lens, i.e., a zoom lens may be used as the positive lens. Diode-lasers of any one type may be sorted to find those having beam-divergence divergence within a design tolerance. In addition, Powell lenses are often reconfigured (re-polished), by trial and error, to match particular diode-laser beam characteristics. These solutions, however effective, can consume a large amount of time or be costly implement. There is a need for a simpler solution for accommodating a wide range of diode-lasers in a particular diode-laser line projector design.

SUMMARY OF THE INVENTION

A diode laser line projector device is disclosed. In one preferred embodiment, the device includes an elongated housing with first and second rotatable sections. A diode laser is mounted within the first section of the housing. An acylindrical lens is mounted within the second section of the housing.

During manufacture, the acylindrical lens is rotated about the propagation axis of the beam to vary the azimuthal angle of the lens with respect to the fast and slow axes of the diode laser. During rotation, the uniformity of the intensity of the line of light projected by the lens is measured. When the desired intensity pattern is achieved, the housing is locked to define a fixed azimuthal position between the lens and the axes of the diode laser.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 2:
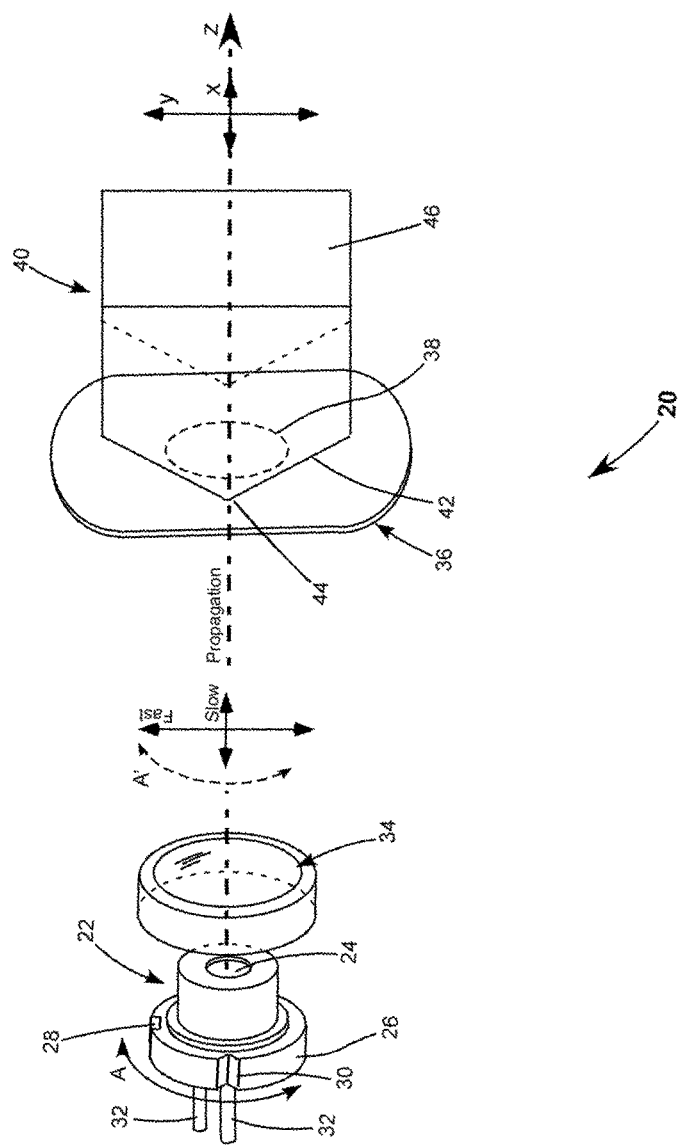
FIG. 2 is a three dimensional view schematically illustrating a preferred embodiment of diode-laser line projection apparatus with provision for adjusting intensity distribution in the projected line in accordance with the present invention, the apparatus including a diode-laser followed by a positive lens, followed by a Powell lens, the diode-laser being rotatable with respect to the Powell lens, for rotating the diode-laser beam with respect to the Powell lens.

Referring now to the drawings, wherein like components are designated by like reference numerals, FIG. 2 schematically illustrates a preferred embodiment 20 of diode-laser line projection apparatus with provision for adjusting intensity distribution in the projected line in accordance with the present invention. Apparatus 20 includes a diode-laser assembly 22 in the "can" form typical of diode-lasers from commercial suppliers of diode-lasers. A diode-laser beam (here with only propagation axis z thereof shown) is emitted through a window 24 in the assembly. The diode-laser has a base 26 which includes a square notch 28 indicating the fast-axis orientation of the diode-laser beam, and a triangular notch 28 indicating the slow-axis orientation of the diode-laser beam. Electrical connections 32 are provided for connecting current to the diode-laser within the assembly "can". The diode-laser beam as is known in the art will be astigmatic with a higher divergence in the fast axis, for example, about 30°, more or less, FWHM, than in the slow-axis, for example about 11° more or less FWHM. As noted above these values are subject to variation within any one diode-laser model and among diode-laser models. The diode-laser beam is transmitted through a positive lens 34 which has one or more of the well-known functions discussed above in such an arrangement.

A Powell lens 40 intercepts the beam from the diode-laser and the positive lens. The Powell lens, here has an acylindrical entrance surface 42 having a vertex 44. The Powell lens here has a planar exit surface 46. The Powell lens has transverse Cartesian y- and x-axes. The y-axis in this instance is perpendicular to vertex 44 of acylindrical surface 42. This y-axis is the axis in which the acylindrical surface has optical power, and is the axis in which the diode-laser beam is spread to form the length of a line of light being projected. The acylindrical surface has zero optical power in the x-axis and the projected beam behavior in this axis is essentially determined by positive lens 34.

Powell lens 40 is configured for a beam having a predetermined y-axis height at the vertex of acylindrical surface 42 of the Powell lens. If it is determined that the actual beam has a height different than the height for which the Powell lens is configured, the diode-laser is rotated with respect to the Powell lens as indicated by arrows A. This correspondingly rotates the beam axes with respect to the Powell lens as indicated by arrows A'. The degree of rotation is adjusted such that the beam has an effective height on the Powell lens vertex which will provide a desired beam uniformity along a projected line.

Apparatus 20 further includes stray light filter 36 having an aperture 38 therein, here, having dimensions just sufficient to pass without attenuation the largest beam dimensions anticipated at the Powell lens. This limits the amount of stray (scattered and the like) light that reaches a surface on which the line of light is projected.

Figure 2A:
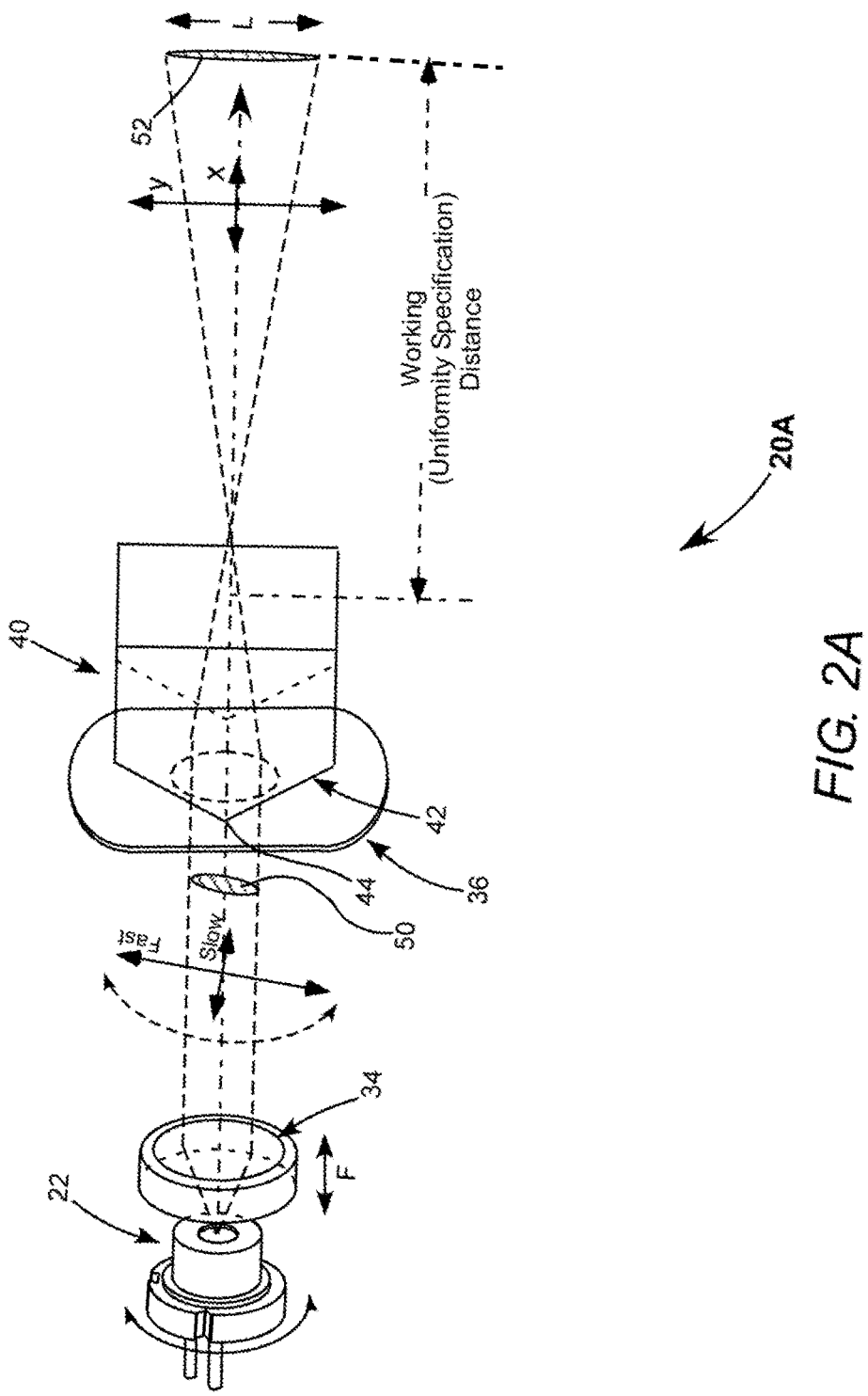
FIG. 2A is a three dimensional view similar to the view of FIG. 2, schematically depicting the diode-laser beam rotated non-orthogonally with respect to transverse optical axes of the Powell lens.

FIG. 2A schematically illustrates an example 20A of the apparatus of FIG. 2 in which exemplary rays from the diode-laser are depicted by dashed lines spread by the Powell lens. In this example, positive lens 34 is configured to focus rays in the x-axis of the Powell lens at a predetermined (specified) working distance from the Powell lens. This is the distance at which the y-axis uniformity is measured when adjusting the rotation in accordance with the present invention to provide a specified uniformity. The diode-laser axes, and beam 50 from positive lens 34, are aligned non-orthogonally with respect to the Powell lens axis. Whatever the degree of the non-orthogonal alignment, the length (L) of the projected line is always aligned with the y-axis of the Powell lens.

One preferred method of measuring uniformity during adjustment of the uniformity by the inventive method is as follows. The laser diode module is installed on a line-scanner. The line-scanner consists of a detector on a linear stage, capable of measuring light intensity along the laser line and tracking Centroid position in the focusing axis (the line-height or thickness axis).

Figure 1:
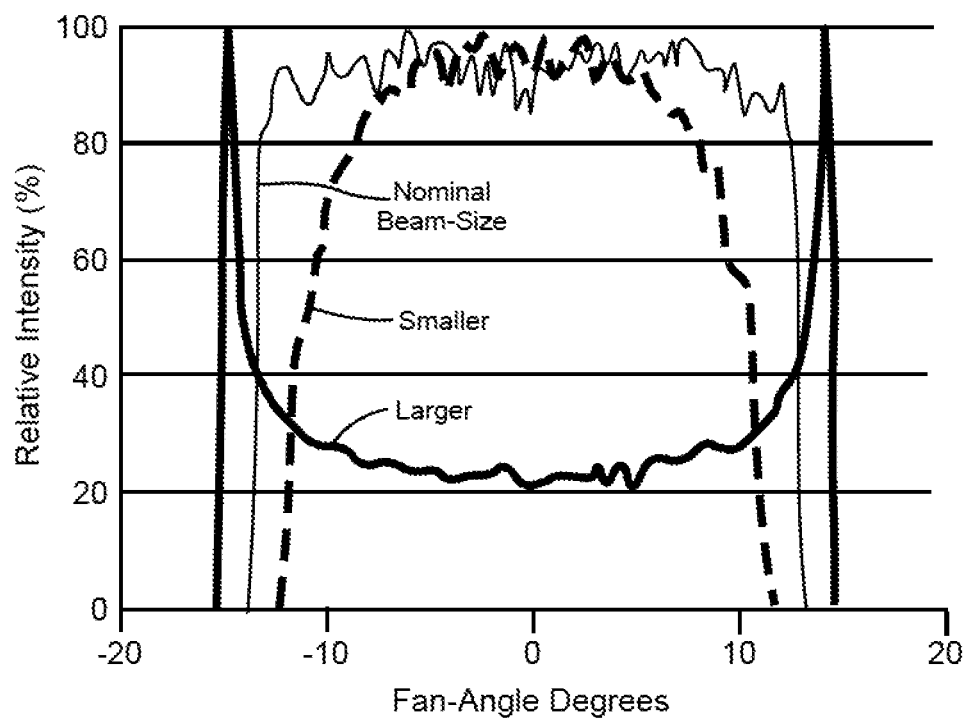
FIG. 1 is a graph schematically illustrating intensity as a function of fan-angle for a nominal beam-size for which the Powell lens is designed and for beams larger and smaller than the nominal size.

The output of the line-scanner gives a uniformity profile of the type depicted in FIG. 1. The module is nominally located about 0.5 m from the detector plane, but can be placed at other specific locations. Those skilled in the art to which the present invention pertains may employ other uniformity measurement methods without departing from the spirit and scope of the present invention.

Figure 3:
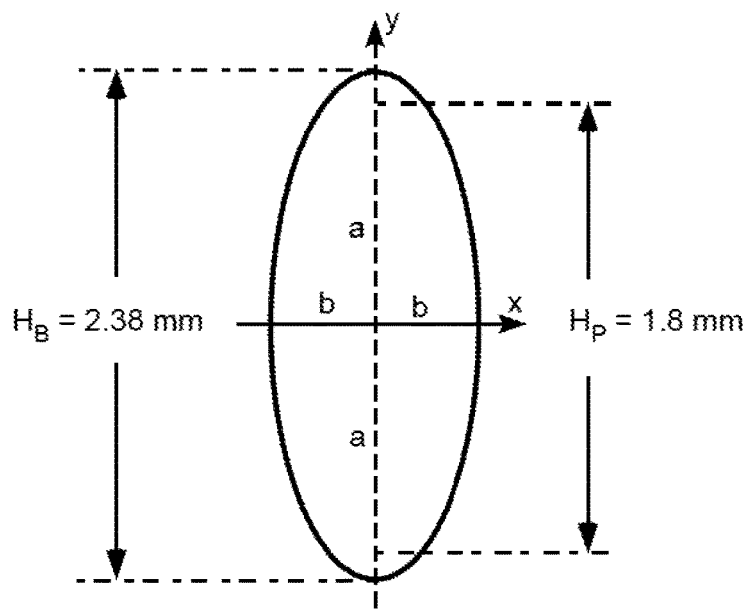
FIG. 3 schematically illustrates an exemplary diode-laser beam orthogonally aligned with axes of a Powell lens, with the exemplary beam having a height greater than the height for which the Powell lens is configured.
Figure 4:
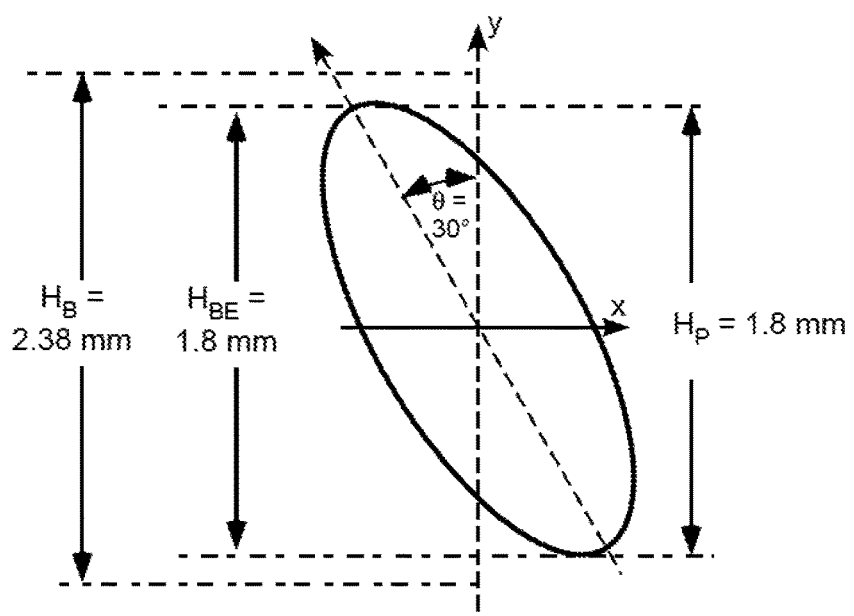
FIG. 4 schematically illustrates the exemplary beam of FIG. 3 rotated at an angle of 30° to the axes of the Powell lens such that the beam has an effective height at the Powell lens equal to the beam height for which the Powell lens is configured.

As discussed above, in a typical commercial environment, the optimum rotational position of the Powell lens is determined empirically. FIG. 3 and FIG. 4 are provided to explain the uniformity adjustment method in more analytical terms. FIG. 3 schematically illustrates an elliptical beam having a fast axis dimension 2a and a slow axis dimension 2b. Here, the beam has the fast- and slow-axes thereof aligned with the y-axis of the Powell lens. In this example, it is assumed that the Powell lens is configured for a beam height ($H_P$) in the y-axis of 1.8 mm. The actual beam height ($2*a=H_B$) in this aligned condition is 2.38 mm.

FIG. 4 schematically illustrates the beam rotated by 30° with respect to the Powell lens according to the inventive method. This provides that the effective height $H_{BE}$ of the beam on the Powell lens is equal to the configured value of 1.8 mm.

The Effective height as a function of rotation angle (θ) of the fast axis from the y-axis of the Powell lens is given by an equation:

$$H_{BE}=(a^{2}*\text{Cos}(\theta)^{2}+b^{2}*\text{Sin}(\theta)^{2})^{0.5} \qquad (1)$$

where a and b are as defined above.

Figure 5:
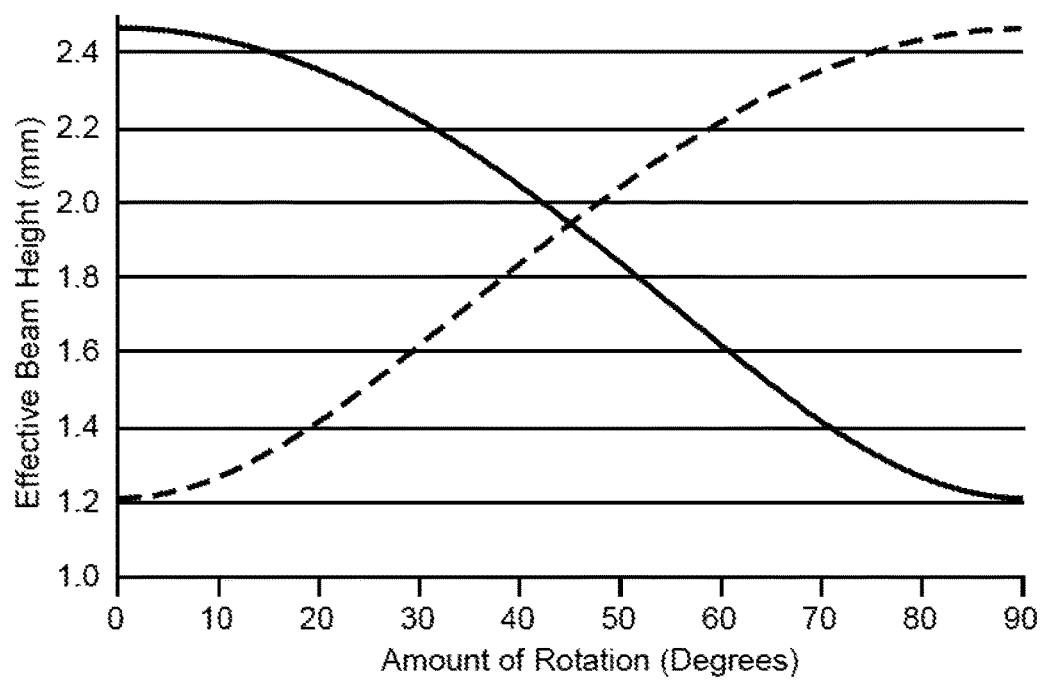
FIG. 5 is a graph schematically illustrating effective beam-size as a function of rotation angle of an elliptical beam with respect to Powell lens axes as depicted in FIG. 4.

FIG. 5 is a graph of calculated effective beam height for a case where 2a=2.46 mm and 2b=1.21 mm. The solid curve is for the above discussed case where the beam is initially aligned with the fast axis thereof in (at 0 degrees) the y-axis of the Powell lens. The dashed curve in FIG. 5 represents a case where the slow-axis is initially aligned with the y-axis of the Powell lens. A reason for choosing this latter case is discussed further hereinbelow.

Summarizing the inventive uniformity adjustment method here, the Powell lens is configured for a desired Fan angle and a particular beam height between the maximum and minimum beam heights anticipated from a variety of diode-lasers. The beam height at the Powell lens location is then calculated or preferably measured, by any well-known means. A nominal rotation angle can then be calculated or estimated, as discussed above, for providing a specified distribution. An initial uniformity scan of the projected line is performed (as discussed above) with the laser-diode nominal rotation angle. Starting at the calculated or estimated rotation, fine adjustment of the rotation can be performed while measuring the distribution to further improve the distribution, if necessary. In a preferred practical configuration discussed below the diode-laser can be rotated with respect to the Powell lens, and the rotation angle can fixed once a satisfactory distribution is measured.

It should be noted here that the inventive method will not compensate for a poorly configured or polished Powell lens. Accordingly, the Powell lens should be configured for proper performance for the beam characteristics chosen as nominal. Custom Powell lenses are commercially available, for example from Laserline Optics Canada Inc., of Kanata, Ontario, Canada. A desired specification for the acylindrical surface can be calculated for a particular optical glass and combination of diode-laser and positive lens by using commercially available optical design software such as ZEMAX available from the Radiant Zemax Corporation of Redmond, Wash.

It should also be noted that with the rotation of the diode-laser beam axes from the Powell lens axes, there will be some corresponding changes in the length and width of the projected line. These are typically less important in an application than ensuring the best available uniformity of distribution along the line. If a wide range of beam sizes is anticipated it might be advisable to stock two different Powell lens configurations for each of the above-discussed alignment cases (fast-axis or slow-slow axis aligned with the y-axis of the Powell lens) in order to limit the extent of the rotation, for example to plus or minus 30°, that is necessary for any one diode.

One reason for an alignment of the slow-axis of a beam at or close to the y-axis of the Powell lens (dashed curve of FIG. 5), is that fast-axis diode-laser rays can be used to focus for the line width or height. The diode-laser beam has a larger divergence in the fast-axis than the slow-axis and this alignment would provide for a narrower focused or "tighter" line. In the examples depicted above where the Powell lens more closely matches the fast-axis beam height, the slow-axis diode-laser rays are focused and provide a larger depth of focus than would be the case if the fast-axis rays were focused.

Figure 6:
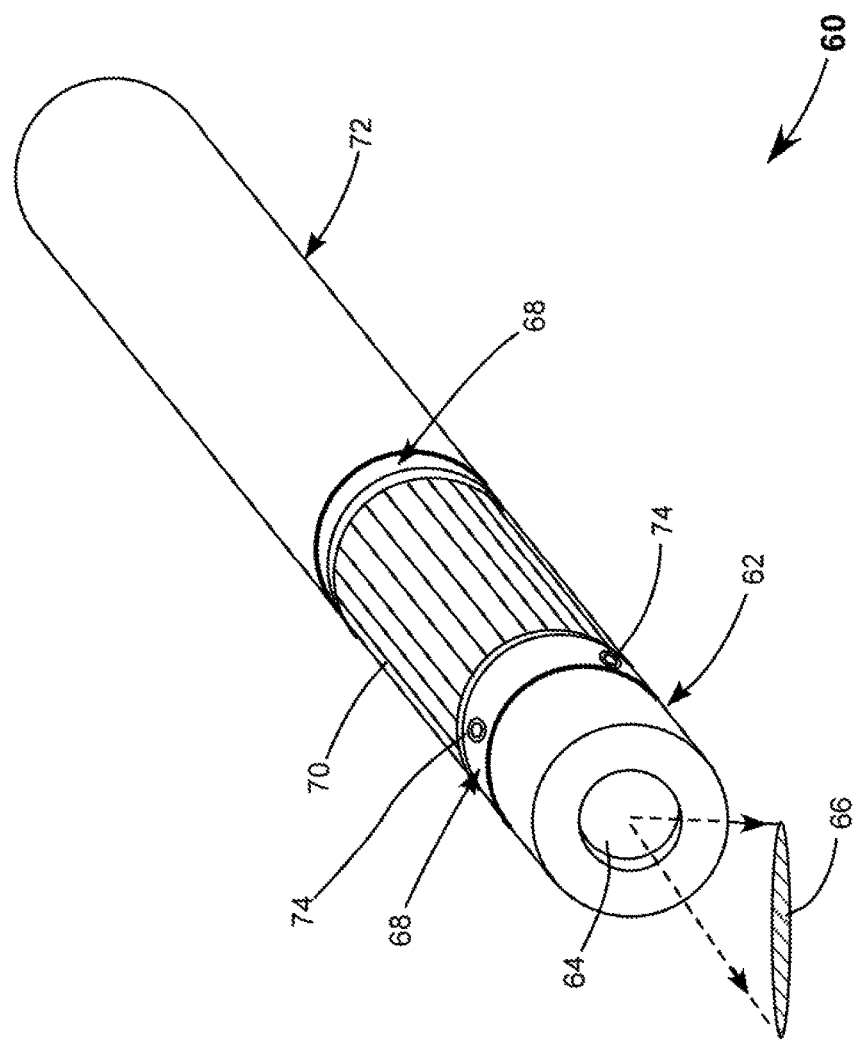
FIG. 6 is a three-dimensional view schematically illustrating one practical example of diode-laser line projection apparatus configured to accommodate the beam uniformity adjustment method of the present invention.

FIG. 6 schematically illustrates an example 60 of a diode-laser line projector configured for accommodating the components of FIG. 2 and implementing the beam uniformity adjustment method in accordance with the present invention. Projector 60 comprises three basic units. A basic unit 62 houses the Powell lens. A line of light 66 is projected from an aperture 64 in unit 62. Unit 62 is fixedly attached to a focusing unit 68 which includes a focusing sleeve 70 rotatable with respect to the focusing unit for providing linear (z-axis) translation of the positive lens of FIG. 2. A diode-laser unit 72 has a positive-lens subassembly (not shown in FIG. 6) attached thereto and enclosed within focusing unit 68. Unit 72 is rotatable with respect to unit 62 for implementing the inventive beam-uniformity adjustment method. Once a preferred rotation is determined, that rotation can be fixed by tightening set screws 74 which bear on the positive-lens subassembly.

Figure 7:
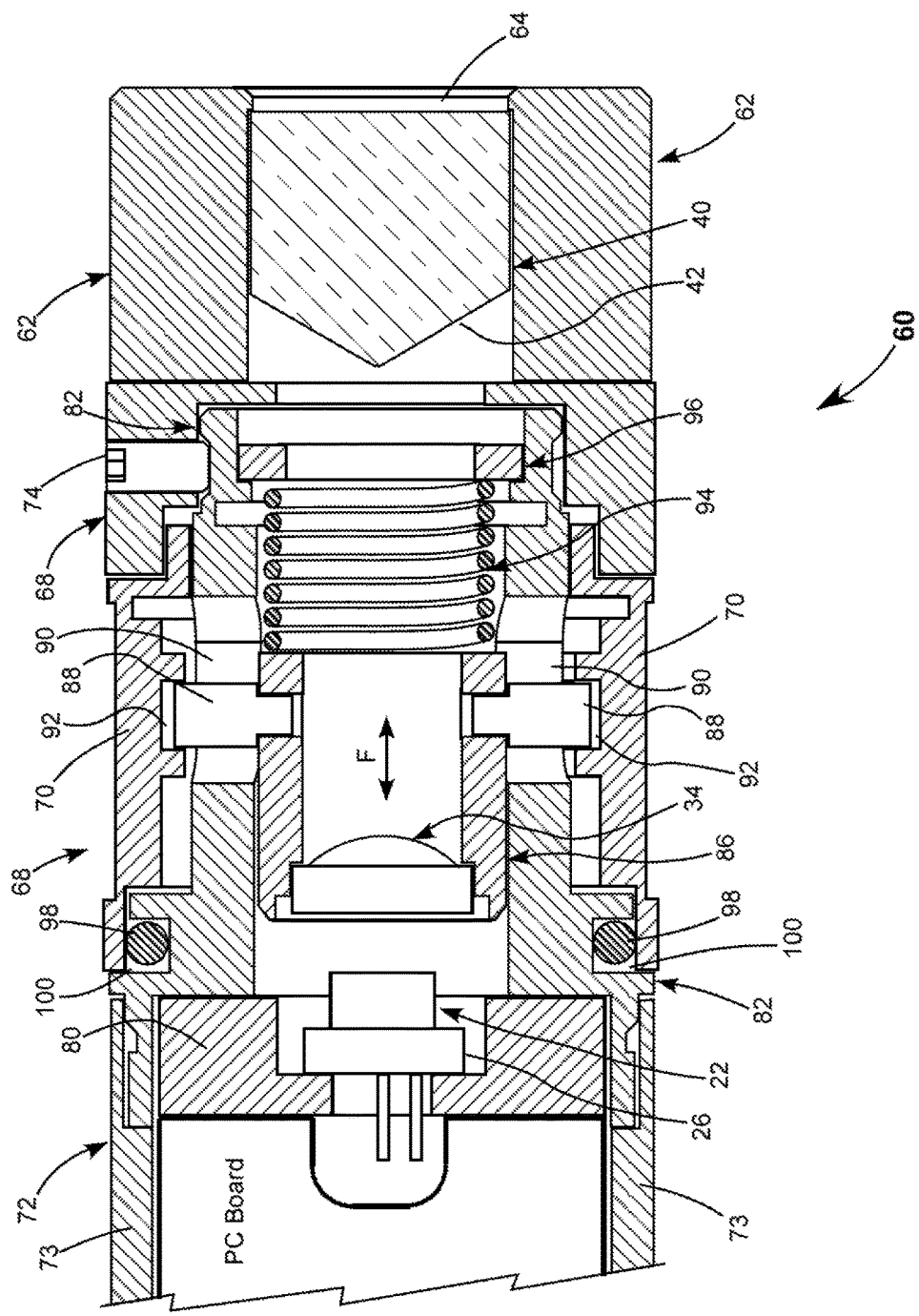
FIG. 7 is a longitudinal cross-section of the example of FIG. 6.

FIG. 7 is a longitudinal cross section view of the unit of FIG. 6 depicting the components which allow the inventive uniformity adjustment method to be implemented. The diode-laser, positive lens, and Powell lens are designated by the same reference numerals as in FIG. 2.

In unit 72, covered by a housing 73, diode-laser 22 is attached by base 26 thereof to a mounting flange 80. Flange 80 has a PC board (with driver components of the diode-laser) attached thereto. The PC board is attached to housing 73 by means not shown. Flange 80 is fixedly attached to a focus subassembly housing 82, which extends to the front of focus unit 68 as illustrated. If set screws 74 (only one visible in FIG. 7) are not tightened, unit 72 and diode-laser 80 attached (indirectly) thereto can be rotated relative the Powell lens in unit 62. When a satisfactory orientation of the diode-laser with respect to the Powell lens has been found, screws 74 can be tightened against subassembly housing 82, as illustrated, to fix the diode-laser orientation with respect to the Powell lens.

Positive lens 34 is fixedly held at one end of a cylindrical lens-holder 86, which has a sliding fit in subassembly housing 82. Links 88, at one end thereof, engage lens holder 86 via elongated slots 90 in subassembly housing 82. Links 88 at an opposite end thereof engage a spiral channel 92 in focusing sleeve 70.

Turning sleeve 70 translates lens-holder 86 and lens 34 therein as indicated by arrows F. A spring 94 is compressed between lens-holder 86 and retaining-flange 96 screwed into subassembly housing 82. This prevents movement of the lens by external forces. An O-ring 98 is trapped in a channel 100 in subassembly housing 82 by focusing sleeve 70. This provides sufficient friction to retain a rotation of the focusing sleeve after a focus adjustment.

A description of the effectiveness of the inventive beam uniformity adjustment method is set forth below with reference to FIG. 8A, FIG. 8B, and FIG. 8C, which are graphs depicting measured relative uniformity as a function of position along a projected line from a projector similar to the projector of FIGS. 6 and 7. In this projector, the laser-diode is a diode-laser emitting radiation at a wavelength of 515 nm. The positive lens is a model PL-250 from Osram GmbH of Munich Germany. The Powell lens is configured to project a beam having a height (y-axis height) of 1.3 mm into a fan angle of about 30 degrees. The fast-axis and slow-axis beam-dimensions at the Powell lens are 2.7 mm and 1.1 mm respectively measured at the $1/e^2$ level. Power was measured by the method discussed above at a distance of 0.5 meters (500 mm) from the exit face of the Powell lens.

Figure 8A:
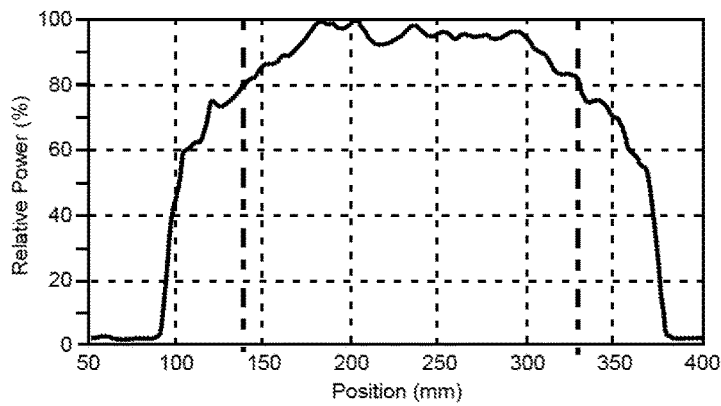
FIG. 8A is a graph schematically illustrating measured relative power as a function of line length for a diode-laser beam having a fast-axis and a slow-axis projected from a 515 nm wavelength diode-laser onto a Powell lens for spreading the beam to form the line, with the slow-axis of the beam aligned with the Powell lens.

In the measurement of FIG. 8A the slow-axis of the beam is aligned with the Powell lens, i.e., aligned with y-axis of the Powell lens as described above. This makes the beam height at the Powell lens less than the design height of 1.3 mm providing a rounded distribution similar to that of FIG. 1. Given a uniformity specification of greater than 80% along a line this would be applicable to a line having a length of about 190 mm (defined between vertical dash-dot lines at 145 mm and 335 mm).

Figure 8B:
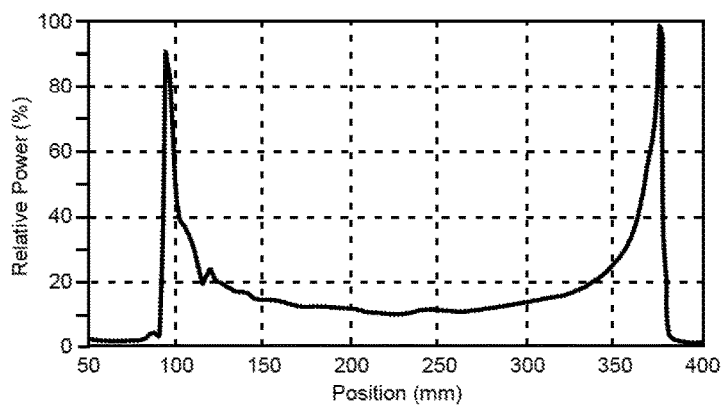
FIG. 8B is a graph schematically illustrating measured relative power as a function of line length when the diode-laser beam of FIG. 8A has the fast-axis thereof aligned with the Powell lens.

In the measurement of FIG. 8B the fast-axis of the beam is aligned with the Powell lens. This makes the beam height at the Powell lens much greater than the design height of 1.3 mm providing a "pitchfork" distribution similar to that of FIG. 1. Here of course the power distribution is completely unacceptable.

Figure 8C:
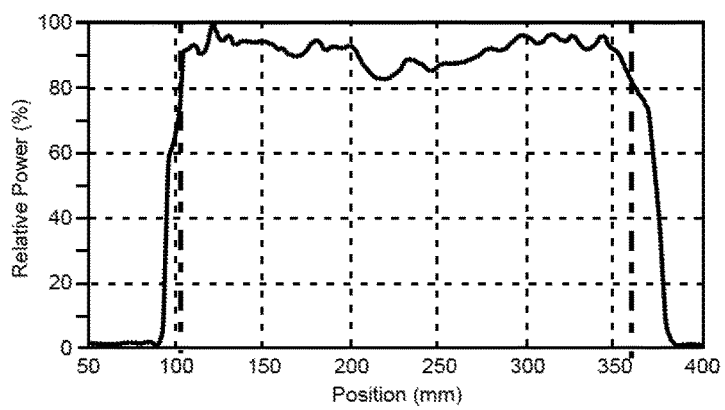
FIG. 8C is a graph schematically illustrating measured relative power as a function of line length when the diode-laser beam of FIG. 8A has the slow-axis thereof aligned at angle of 30° to the Powell lens.

FIG. 8C is a graph schematically illustrating measured relative power as a function of line length when the diode-laser beam of FIG. 8A has the slow-axis thereof aligned at angle of 30° to the Powell lens i.e., rotated at 30 from with y-axis of the Powell lens. Here the relative power is above 80% over a length of about 260 mm, with an RMS variation along the length less than in the case of the 190 mm length of FIG. 8A.

In a preferred method of implementing the subject invention, the person assembling the device will determine the nominal parameters of the diode laser being used. The nominal parameters are typically provided by the manufacturer of the diode laser. Based on this information, the assembler would select a Powell lens having the parameters best matched to the diode laser. During set up, the acylindrical axis of the lens can be aligned with one of either the fast or slow axes of the diode laser. Thereafter, the azimuthal angle of the Powell lens can be adjusted with respect to the axes of the diode laser while intensity measurements are made as described above. When the optimal performance is achieved, the set screws 74 are tightened, locking the elements of the unit in place. This procedure results in a projector with relatively uniform intensity across the line of light at relatively low cost since the tolerances for the Powell lens can be relaxed.

The present invention is described above in terms of a preferred and other embodiments. The invention, however, is not limited to the embodiments described and depicted. Rather the invention is limited only by the claims appended hereto.

What is claimed is:

1. A diode laser line projector device comprising:
   an elongated housing having first and second sections, said sections being rotatable with respect to each other along the longitudinal axis of the housing;
   a diode laser mounted within the first section of the housing, said diode laser generating a beam of radiation having orthogonal fast and slow axes mutually perpendicular to the longitudinal axis of the housing;
   a first lens mounted within the second section of the housing, said first lens having an acylindrical surface including a vertex lying along a first axis perpendicular to the longitudinal axis the housing; and
   means for selectively locking the first and second sections of the housing together to prevent rotation after the vertex of the acylindrical surface of the first lens has been preferentially aligned with respect to the axes of the diode laser.

2. A device as recited in claim 1 wherein said locking means is defined by set screws extending through a wall of the housing.

3. A device as recited in claim 1 wherein said first lens is a Powell lens.

4. A device as recited in claim 1 further including a second lens mounted in the housing and positioned between the diode laser and the first lens.

5. A device as recited in claim 4 wherein said housing further includes a means for adjusting the spacing between the second lens and the diode laser.

6. A diode laser line projector device comprising:
   an elongated housing having a longitudinal axis;
   a diode laser mounted within the housing, said diode laser generating a beam of radiation having orthogonal fast and slow axes mutually perpendicular to the longitudinal axis of the housing; and
   a first lens mounted within the housing and spaced from the diode laser for projecting the beam of radiation generated therefrom along a line, said first lens having an acylindrical surface including a vertex lying along a first axis perpendicular to the longitudinal axis the housing and aligned between the fast and slow axes of the diode laser at a position so that the uniformity of the intensity distribution of light along the projected line is greater than 80 percent.

7. A device as recited in claim 6 wherein said first lens is a Powell lens.

8. A device as recited in claim 6 further including a second lens mounted in the housing and positioned between the diode laser and the first lens.

9. A device as recited in claim 8 wherein said housing further includes a means for adjusting the spacing between the second lens and the diode laser.

* * * * *